March 28, 1961  F. E. TUCZEK  2,977,111
HYDRO-PNEUMATIC TELESCOPIC SHOCK DAMPERS
Filed Jan. 17, 1957  3 Sheets-Sheet 1

Inventor
F. E. Tuczek
By Glascock Downing Seebold
Attys

March 28, 1961 F. E. TUCZEK 2,977,111
HYDRO-PNEUMATIC TELESCOPIC SHOCK DAMPERS
Filed Jan. 17, 1957 3 Sheets-Sheet 2

Inventor
F. E. Tuczek
By Glascock Downing Seebold
Attys

March 28, 1961 F. E. TUCZEK 2,977,111
HYDRO-PNEUMATIC TELESCOPIC SHOCK DAMPERS
Filed Jan. 17, 1957 3 Sheets-Sheet 3
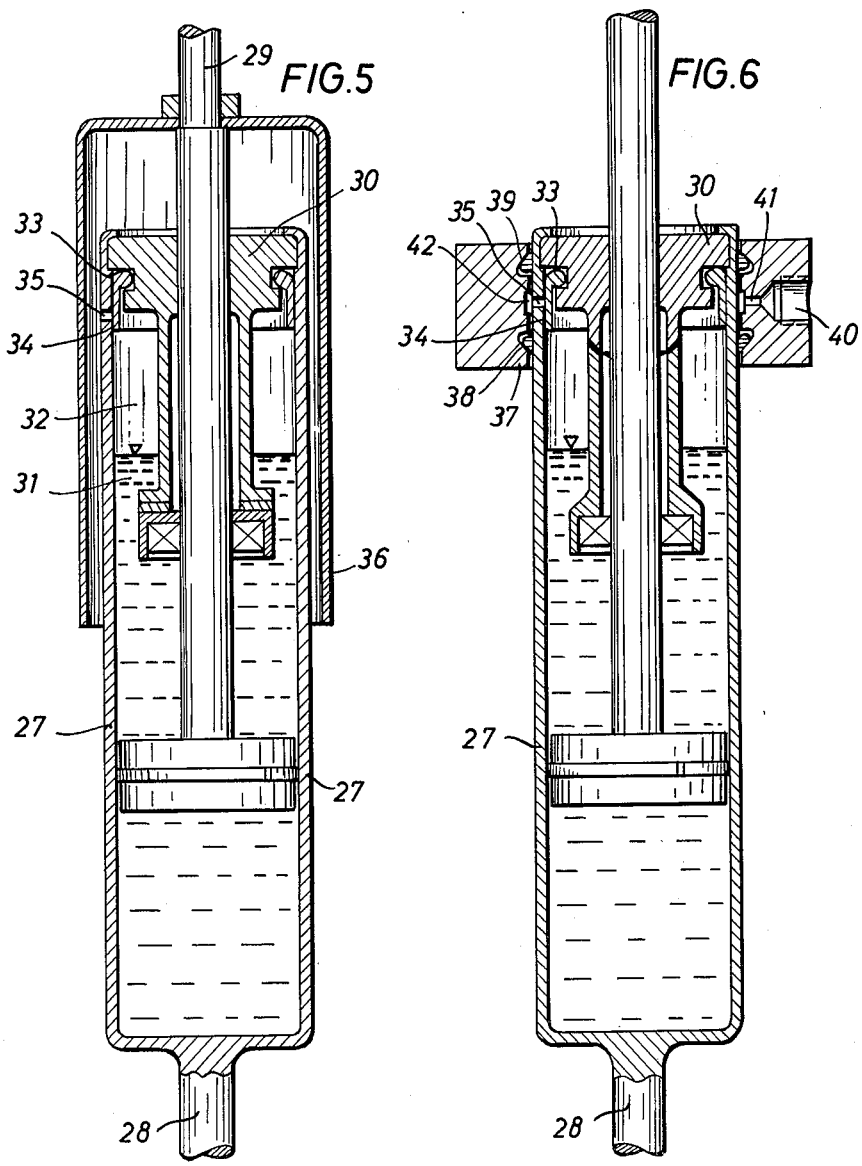
INVENTOR.
F. E. Tuczek
BY
ATTYS.

United States Patent Office 2,977,111
Patented Mar. 28, 1961

2,977,111
HYDRO-PNEUMATIC TELESCOPIC SHOCK DAMPERS

Franz Emil Tuczek, Forster Strasse 38, Weyerhof, Eitorf (Sieg), Germany

Filed Jan. 17, 1957, Ser. No. 634,765

Claims priority, application Germany Jan. 28, 1956

8 Claims. (Cl. 267—64)

This invention relates to a hydro-pneumatic single-tube telescopic shock damper in which there is a considerable distance between the piston rod guide in the cover plate on the end through which the piston rod projects and the rod packing. In such shock dampers the piston rod is guided in the rod guide and the piston in the cylinder barrel. If the rod packing is held rigidly in its position in relation to the cylinder barrel, the appearance of lateral forces on the rod packing cannot be avoided, because the position of the piston rod is determined by its bearing in the rod guide and that of the piston by the cylinder barrel and owing to the inaccuracies in manufacture which are always present and the play in the bearings the center line of the piston rod does not coincide with the center line of the unloaded packing. The satisfactory operation of the sensitive rod packing is thereby endangered.

A hydro-pneumatic telescopic shock damper according to the invention is characterised by the rod packing being mounted in a packing holder guided loosely on the piston rod which is pressed in the axial direction by the pneumatic pressure sealingly against a fixed casing part, for example the end cover, and is laterally movable. In this way, lateral forces are kept away from the packing, because the packing holder can follow the lateral movements of the piston rod.

Further features of the invention will be described below and pointed out in the claims.

The accompanying drawings show some examples embodying the invention.

Figure 5 is an axial section of a damper having a protecting tube and

Figure 6 is a view of a damper on which has been mounted a filling device, the latter being shown in section.

Figure 1:
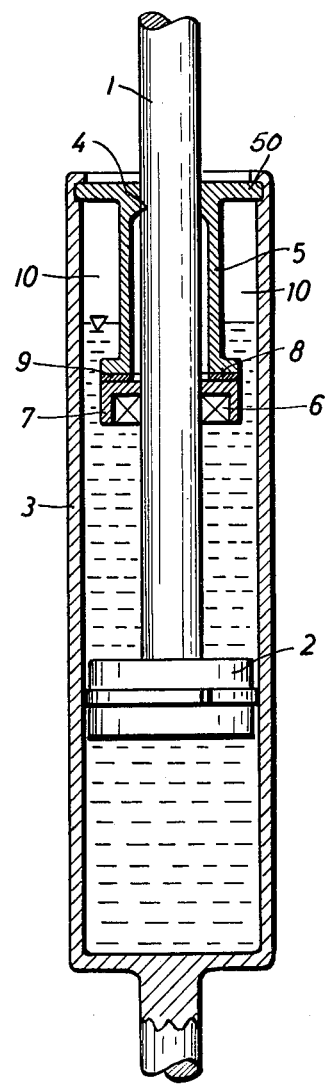
Figure 1 is an axial section of an example having a packing holder with a flat sealing surface which in the axial direction is close to the packing.
Figure 2:
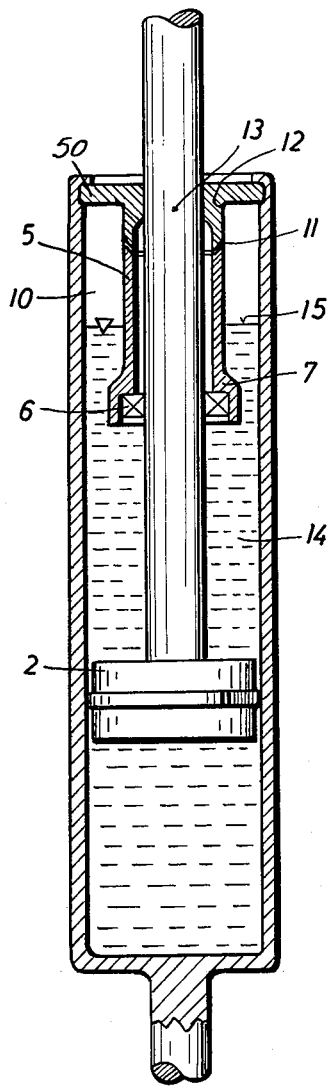
Figure 2 is an axial section of an example in which the packing holder has a spherical sealing surface which in an axial direction is at a much greater distance from the rod packing.

In Figures 1 and 2 a piston rod 1 carries a piston 2 which slides in a cylinder barrel 3 and is guided by a rod guide 4 having a neck 5 and is sealed by a packing 6 in a packing holder 7. In Figure 1 a sealing disc 9 is located between the end surface 8 of the neck 5 and the end surface of the packing holder 7. The holder 7 is pressed towards the end surface 8 by the pneumatic pressure in the chamber 10 and is thereby sealed thereto, lateral sliding of the packing holder relative to the end surface 8 being, however, possible in accordance with the invention. A cover, designated by reference character 50, closes the cylinder end through which rod 1 emerges.

In Figure 2 wherein like parts are designated by corresponding reference characters, the sealing surface or disc 11 is immediately beneath the rod guide 12 and is of spherical form, the center 13 of the sphere being approximately in the center of the rod guide. In both Figures 1 and 2 there is a free surface 15 between the chamber 10 and a volume of oil 14.

Figure 3:
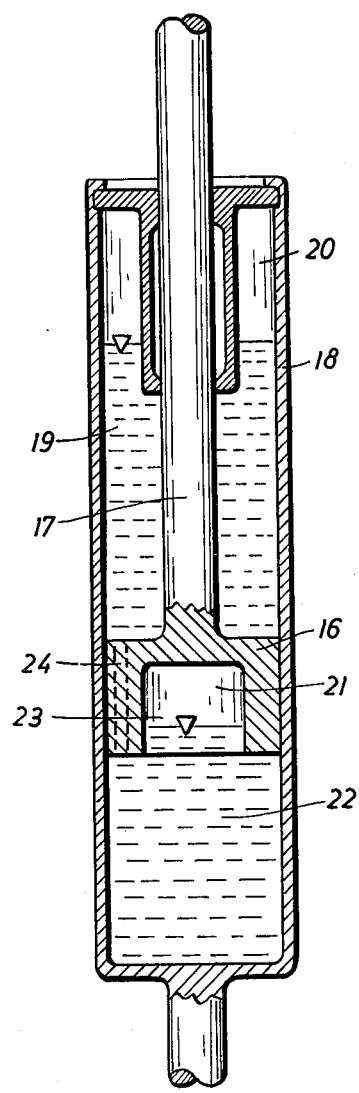
Figure 3 is an axial section of a damper having a hollow piston.
Figure 4:
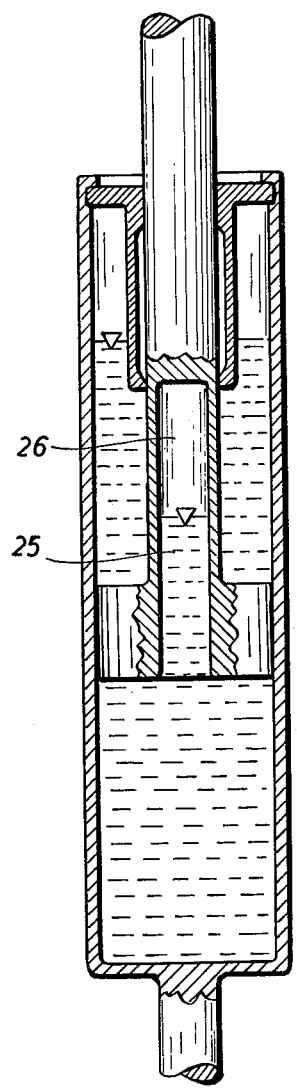
Figure 4 is an axial section of a damper having a hollow piston rod.

Figures 3 and 4 show two examples of embodiment.

The piston 16 is carried on the end of a piston rod 17 and slides in the cylinder barrel 18, the outer working chamber 19 of which contains the gas cushion 20. The gas cushion 21 for the inner working chamber 22 is provided in the hollow 23 of the piston. At 24 there is sufficient material for the provision of valves in the piston of known kind.

Figure 4 shows the same parts, except that the piston rod is made hollow and in the hollow 25 contains the gas cushion 26 for the inner working chamber.

For charging with air which constitutes the gas cushions described, according to the embodiments shown in Figures 5 and 6, the outer tube or cylinder barrel can have a charging bore which has no projecting part projecting from the outer wall and a non-return valve can be provided at the point where the charging bore passes through the inner wall. In this way the burden of charging the damper is reduced to a minimum. If the charging takes place at the end where the piston rod projects and the damper has a protecting tube and an outer tube, the movement of the protecting tube is in no way hindered by the charging opening, but the charging opening is protected against unauthorized access.

The damper consists of an outer tube 27, an anchorage 28, a piston rod 29 carrying a piston and a cover 30 with a piston rod guide and piston rod packing.

Within the damper are an oil volume 31 and an air or gas volume 32. A packing ring 33 serves for sealing between the cover 30 and the outer tube of the damper and has a thin walled extension 34 which serves as a non-return valve for a bore 35. A protecting tube 36 covers the outer tube 27 in the region of the bore 35, and is broken away to reveal a piston rod sealing structure similar to the Figure 1 organization. The charging device shown in Figure 6 comprises a cylindrical body 37 which is sealed to the outer tube 27 by two rubber rings 38 and 39 and contains a tapped entry connection 40. From this the air through a bore 41 reaches an annular groove 42 and thence through the bore 35 to the interior of the damper. The tube 27 is shown to in section reveal a rod sealing structure similar to Figure 2.

I claim:

1. A hydro-pneumatic telescopic shock damper comprising in combination a piston, a cylinder housing said piston, a piston rod, a cover on the cylinder through which the piston rod projects, a portion of said cover extending into the cylinder, a quantity of working fluid in the cylinder incompletely filling it, a piston rod guide formed by said cover, a packing holder on the end of said cover portion, a packing in said holder sealing a joint between said rod and the said holder a substantial distance from the said guide and below the fluid level, a first sealing surface formed on said holder, and a second sealing surface facing said first sealing surface formed on said cover portion so that under the pneumatic pressure within the damper said holder is pressed axially and a seal is made at the said sealing surfaces.

2. A telescopic shock damper as set forth in claim 1 including a sealing disc interposed between said sealing surfaces, permitting lateral mounting of said holder.

3. A telescopic shock damper as set forth in claim 2 in which said sealing surfaces and said disc are flat.

4. A telescopic shock damper as set forth in claim 2 in which said sealing surfaces are at least approximately spherical.

5. A telescopic shock damper according to claim 4 in which the center of the sphere is at the center of said rod guide.

6. A telescopic shock damper as set forth in claim 1, including a radial charging bore penetrating the cylinder adjacent the said cover, and a sealing ring on said cover having a depending portion extending over said charging bore to form a non-return valve.

7. A hydro-pneumatic shock damper comprising in combination a cylinder having one end closed and defining a volume, a piston slidable in said cylinder, a rod secured to said piston to pass through the other cylinder end, means surrounding the said rod to close the said other cylinder end and to laterally support the rod, a body of working fluid in the cylinder, the quantity thereof being less than the cylinder volume to define an air cushion, the said closing means being formed into a sleeve extending inwardly a substantial distance and into the working fluid, and sealing means mounted on said sleeve to permit lateral movement and compensate for misalignment between the rod axis and the cylinder axis, said sealing means comprising a holder on the extremity of said closing means, a packing in said holder engaging against the said rod, a pair of sealing surfaces formed on the sleeve, and a sealing disc disposed between the surfaces.

8. The invention as set forth in claim 7, wherein the said sealing surfaces are spherical and the center of the sphere is at the center of the rod.

References Cited in the file of this patent

UNITED STATES PATENTS

| | | |
|---|---|---|
| 312,164 | Bankin | Feb. 10, 1885 |
| 2,667,348 | Frye et al. | Jan. 26, 1954 |
| 2,721,074 | Bourcier De Carbon | Oct. 18, 1955 |
| 2,769,632 | Bourcier De Carbon | Nov. 6, 1956 |
| 2,774,446 | Bourcier De Carbon | Dec. 18, 1956 |